Feb. 9, 1960　　　　F. W. LINDBLOM　　　　2,923,944
GOGGLE WITH REMOVABLE LENS COVER
Filed June 27, 1957　　　　　　　　　　　　　　2 Sheets-Sheet 1
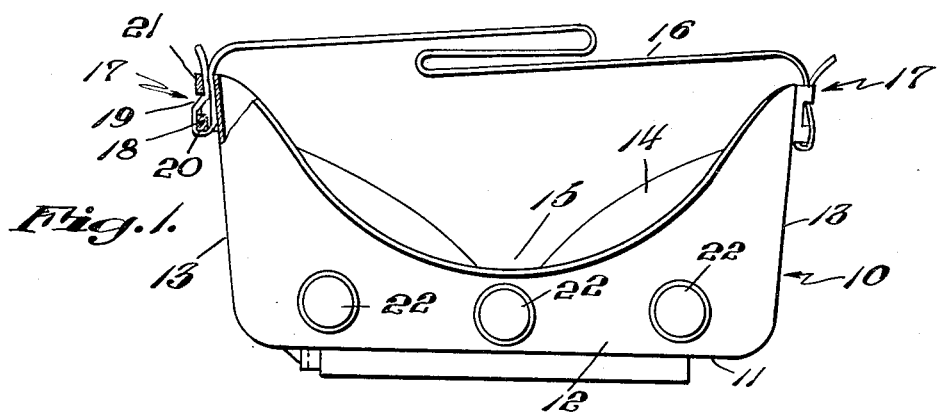
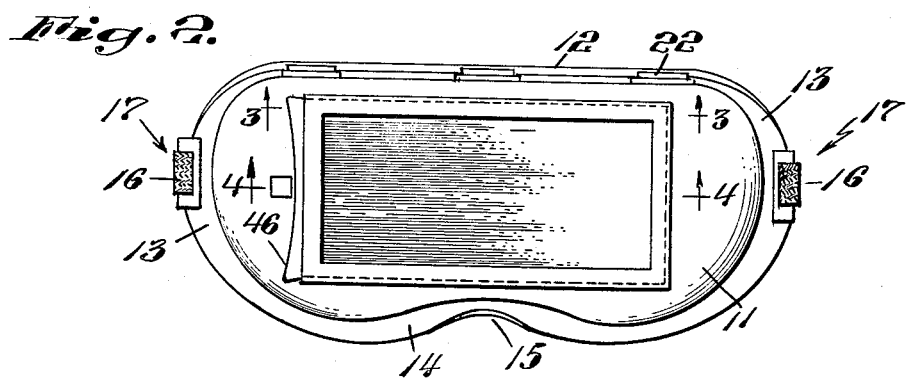
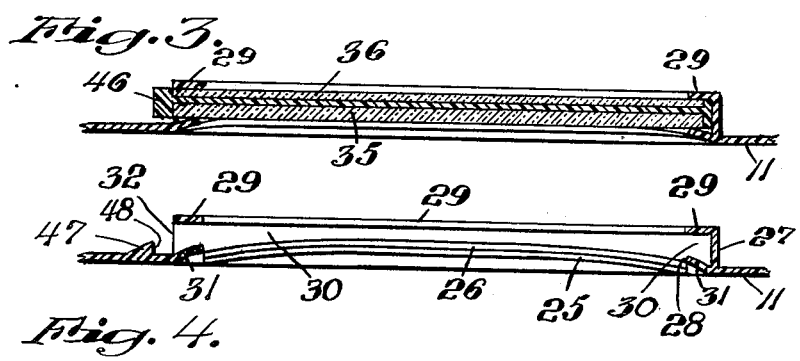
INVENTOR.
Frank W. Lindblom
BY
Barlow & Barlow
ATTORNEYS.

Feb. 9, 1960  F. W. LINDBLOM  2,923,944
GOGGLE WITH REMOVABLE LENS COVER
Filed June 27, 1957  2 Sheets-Sheet 2
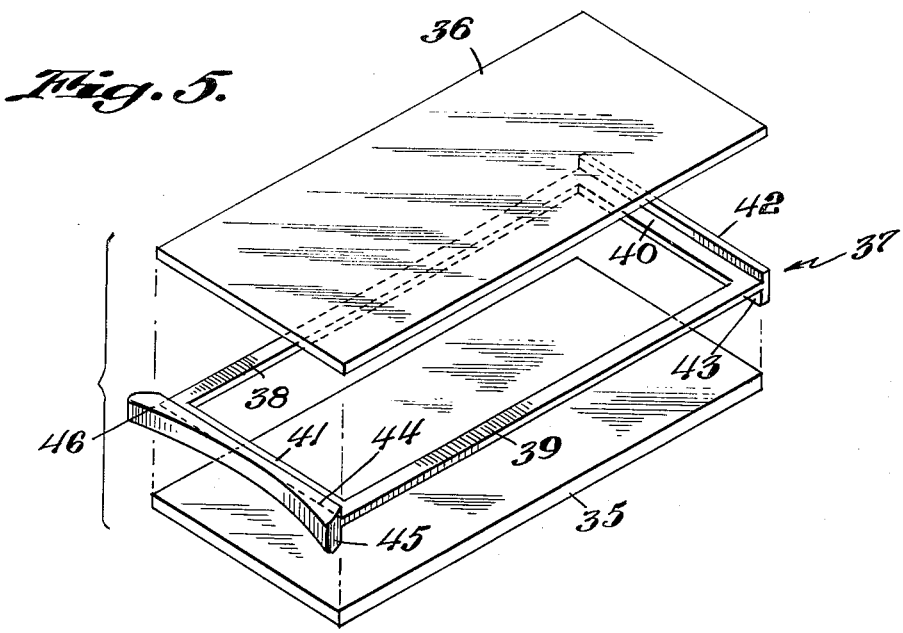
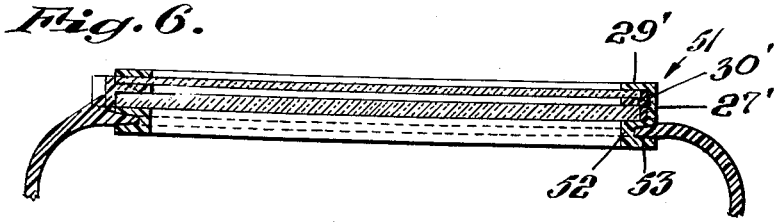
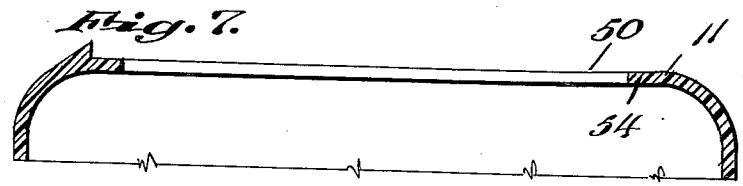
INVENTOR.
Frank W. Lindblom
BY
Barlow & Barlow
ATTORNEYS.

United States Patent Office 2,923,944
Patented Feb. 9, 1960

2,923,944

GOGGLE WITH REMOVABLE LENS COVER

Frank W. Lindblom, Warwick, R.I., assignor to Welsh Manufacturing Company, a corporation of Rhode Island Application June 27, 1957, Serial No. 668,524

5 Claims. (Cl. 2—14)

This invention relates to a goggle, particularly to that type of goggle which is used for protecting the eyes of a welder in the use of which particles may fly to contact the lens of the goggle and injure the same.

In goggles of this character, it is desirable to provide some sort of easily removable and replaceable inexpensive cover for the more expensive lens so that this cover will take the abuse rather than the lens, the cover being removed and replaced as occasion may require.

One of the objects of this invention is to provide a goggle which will simplify the removal of a cover lens and the replacement of the cover lens by a fresh one.

Another object of this invention is to provide for this interchangeability of cover from the front of the goggle where it is more easily accessible than it would be if it was necessary to operate from the inner side of the goggle.

Another object of the invention in connection with the ease of interchangeability is the provision of an arrangement for sliding the lenses in place.

Another object of the invention is to provide a means of tensioning the main and the cover lenses by pressing them toward each other without the use of metal springs.

Another object of the invention is to provide a goggle from a non-metallic material such as some of the more recent plastics and so shape this plastic material by molding that, as the stiffer lens is slid into position, the body of the goggle will be deformed from its molded shape, and pressure will be applied on the lens or lenses by reason of the body tending to return to its molded shape so as to hold the lens or lenses as tight as desired in the goggle.

An over-all object of the invention is also to reduce the cost of manufacture and provide a goggle which is comfortable on the face and so shaped that it may provide the desired vision and protection for which it is designed.

With these and other objects in view, the invention consists of certain novel features of construction, as will be more fully described and particularly pointed out in the appended claims.

In the accompanying drawings:

Fig. 1 is a top plan view of the goggle;
Fig. 2 is a face view;
Fig. 3 is a section on line 3—3 of Fig. 2;
Fig. 4 is a section on line 4—4 of Fig. 2 with the lenses omitted;
Fig. 5 is a perspective exploded view of the lenses and the carrier member for the lenses;
Fig. 6 is a sectional view similar to Fig. 3 but of a modified construction; and
Fig. 7 is a sectional view of a part of Fig. 6, that is, the body of the goggle with the separable lens containing portion removed or prior to its being assembled therewith.

In proceeding with this invention, I have molded the body portion of a goggle from one of the plastic type materials such as polyethylene and provided a window opening in the face of the body with a means for retaining a main lens and a cover lens extending across this opening to close the same, the lenses being slidable into position by a carrying member. I have so shaped the molded material and formed it of a flexible resin that, as the lenses are slid into position, there will be change of shape of the portions about the opening so that a tension is applied to the edge of the lenses to both seal them in the position to which they are slid and to press one lens against another. Suitable means are provided for sealing the body of the goggle to the face of the wearer.

With reference to the drawings, 10 designates generally the polyethylene body portion of the goggle which has a generally flat or slightly outwardly bulging face 11 from which there extends rearwardly a top flange 12, side flanges 13 and a bottom flange 14 which is notched for the reception of the nose as at 15. By proportioning the top and bottom walls and the notch for the nose, the goggle may be made to position its front face 11 in the desired plane or inclined with reference to the vertical, as may be desired.

A strap 16 is detachably secured to molded part 17 which permits the strap to pass through a slot 18 parallel to the flange 13, and then through another slot 19 to weave about spaced bar portions 20 and 21 to permit of the strap being adjusted to the desired length; and as the strap also will be elastic, it may be used for suitable accommodation of different wearers. Ventilating means 22 may be positioned at various locations along the top flange 12 and side flanges 13 as may be found desirable.

The front face 11, as shown more particularly in Fig. 4, is provided with a rectangular window opening 25, and the marginal edges 26 of the face 11 along this opening are molded in arcuate shape as seen in Fig. 4 along the longitudinal extent of the window opening. Walls 27 extend about three sides of the window opening forwardly from the face 11 at a point spaced from the edge 28 of the opening and then inwardly as at flange 29 so as to provide a recess or pocket 30 bounded by the flange 29, the wall 27 and the portion 31 between the edge 28 of the opening and the wall 27. The wall 27 extends substantially at right angles to the face 11, and the flange 29 extends substantially at right angles to the wall 27 so that the entire extent of this flange 29 is in substantially single plane. By this arrangement, the portion 31 which extends inwardly and is arched as at 26 is much closer to the flange 29 midway of the length of the opening than it is at the ends. The formation of this wall 27 is along three sides of the rectangular opening although flange 29 extends along four sides thereof, as shown in the drawings, particularly note Fig. 2, and one end 32 is left open or unwalled so that lenses may be slid into this channel shaped recess 30 for covering the window opening.

The main lens is designated 35 and the cover lens is designated 36 (see particularly Fig. 5); both are relatively rigid and may be glass. These are both rectangular shape or of a shape to conform to the shape of the window opening 25. A carrier member designated 37 (see Fig. 5) consists of a piece of plastic material or polyethylene material, the same as the material of the body 10, and is formed of generally rectangular or frame shape comprising longitudinally extending portions 38 and 39 with end portions 40 and 41 joining these portions 38 and 39. The portions 40 and 41 are flanged or provided with abutments 42 and 43 of the cross member 40 of a depth substantially the thickness of the lenses 35 and 36 on either side thereof; while the portion 41 is flanged or thickened as at 44 and 45 on either side to a thickness substantially the thickness of the lenses and so that when the lenses are mounted with the frame 38—41 between the two lenses 35 and 36, the flanges 42 and 43, 44 and 45 will provide abutments to hold the lenses against sliding lengthwise with reference to the carrier and will be substantially flush on their outer surfaces with the lenses providing a unit which will be substantially the dimension of the recess 30, as seen in Fig. 4. This unit consisting of the carrier 37 and the lenses may then be slid in through the open end 32 along the longitudinally extending walls until it abuts the end wall 27 about the opening. The lenses are of a glass or rigid or stiff construction, stiffer than the polyethylene molded frame or body 10 and will serve to flex the arched edge 26 of the portion 31 which extends inwardly about the opening 25; and as the polyethylene material tends to return to its normal molded shape, there will be applied a slight pressure forcing the two lenses toward each other into compact relation and also providing a means by which the lenses and the carrier will be held in position over the window opening. This also provides a means by which lenses of varying thicknesses may be accommodated and still be retained nicely in position.

The flanges 44 and 45 are shaped so that they provide a good handle portion 46 for withdrawal of the carrier and the lenses from its position should occasion require to withdraw the lenses and replace a pitted cover lens 36 with a fresh cover lens.

In order to further hold the lenses in position, the stock of the face 11 may be molded to provide a catch 47, as shown in Fig. 4, over which the carrier may pass and lodge against the abutment surface 48 so as to prevent it from sliding out of its desired position.

In Fig. 7, I have illustrated the face 11 of the goggle as provided with an opening 50 with no wall molded integral with the face and extending from the opening. The wall in this case is provided as shown generally at 51 in Fig. 6 as a separate unit having a frame 52 corresponding to the shape of the opening 50 and formed with an outwardly flaring tapered groove 53 into which the marginal edge 54 of the face 11 may extend and be held securely by reason of its flexibility and slight compressibility. This frame 52 is equipped with the wall 27' and inwardly extending flange 29' providing a recess or pocket 30' for the reception of the carrier and lenses, as above described and discussed. In this case, the frame 52 will be arched longitudinally somewhat so that a tension will be applied to the lenses in a manner similar to that above described.

I claim:

1. In a goggle a flexible body portion having a window opening with a marginal edge about said opening, a wall protruding forwardly from the body about a portion of the marginal edge of said opening leaving unwalled another portion about the marginal edge of said opening, a flange extending inwardly from said wall providing an inwardly opening recess between said marginal edge and flange adjacent the window opening, a flat rigid lens slidably located in said recess closing said opening, said marginal edge and said flange being closer together than the thickness of the lens so that as the lens is slid into said recess the said marginal edge and flange will be engaged by said lens and at least one of them will be flexed to conform to the shape thereof and will exert pressure thereon to hold the lens in the recess.

2. In a goggle a flexible and resilient body having a window opening, walls protruding forwardly from the body about a portion of the opening leaving unwalled another portion about said opening, flanges extending inwardly from said wall to form an inwardly opening recess adjacent said opening, a lens carrier in said recess comprising a frame having opposite ends and opposite sides with a sight opening therethrough registering with said window opening, said frame being provided with abutments on its opposite faces and at its opposite ends, and a pair of lenses of substantially the size of the frame with one on each face of said frame to be spaced by the frame, one lens engaging the abutments at the opposite ends of the frame on one face and the other lens engaging the abutments at the opposite ends of the frame on the other face, the thickness of said carrier and lenses being slightly greater than the dimension of the recess so as to be frictionally held therein, said carrier being slidable through the unwalled portion about said opening to close or open said window opening.

3. In a goggle as in claim 2 wherein the carrier protrudes from said unwalled portion and serves as a handle to slide said carrier in said recess of said wall.

4. In a goggle as in claim 2 wherein an abutment is provided on the body adjacent the edge of the carrier to engage the edge of the carrier and hold it in working position in said recess.

5. In a goggle as in claim 4 wherein said abutment is tapered on its edge distant from said opening along which the carrier may slide over the abutment as moved into said recess.

References Cited in the file of this patent

UNITED STATES PATENTS

| | | |
|---|---|---|
| 1,759,317 | Malcom | May 20, 1930 |
| 1,904,993 | Malcom | Apr. 25, 1933 |
| 1,986,688 | Thiele | Jan. 1, 1935 |
| 2,156,181 | Jackson | Apr. 25, 1939 |